United States Patent [19]
Kollinek

[11] Patent Number: 5,351,823
[45] Date of Patent: Oct. 4, 1994

[54] VIDEO CASE CLOSURE

[75] Inventor: Kurt Kollinek, Wayne, N.J.

[73] Assignee: American Sealcut Corporation, South Hackensack, N.J.

[21] Appl. No.: 158,403

[22] Filed: Nov. 29, 1993

Related U.S. Application Data

[63] Continuation-in-part of Ser. No. 117,400, Sep. 3, 1993.

[51] Int. Cl.⁵ ............................................. B65D 85/672
[52] U.S. Cl. .................................... 206/387; 206/472
[58] Field of Search .............. 206/387, 472, 474, 475, 206/1.5, 473

[56] References Cited

U.S. PATENT DOCUMENTS

| | | | |
|---|---|---|---|
| 4,407,410 | 10/1983 | Graetz et al. | 206/472 X |
| 4,635,797 | 1/1987 | Bankier | 206/472 |
| 4,681,223 | 7/1987 | Roberts | 206/1.5 X |
| 4,724,957 | 2/1988 | Burgschweiger | 206/472 X |
| 4,753,347 | 6/1988 | Bellante et al. | 206/472 X |

*Primary Examiner*—Jacob K. Ackun, Jr.

[57] ABSTRACT

A plastic case suitable for housing objects, such as a video cassette, and manufactured by assembling a sandwich of heat-sealable members including a non-heat sealable stiffener member and then moving the assembly to a heat-sealing machine to permanently seal the parts together. The case comprises opposed sections joined by a spine, with the edges of the case sections that come together when the case is closed being provided with interlocking half-rounded members serving as a case closure.

12 Claims, 3 Drawing Sheets

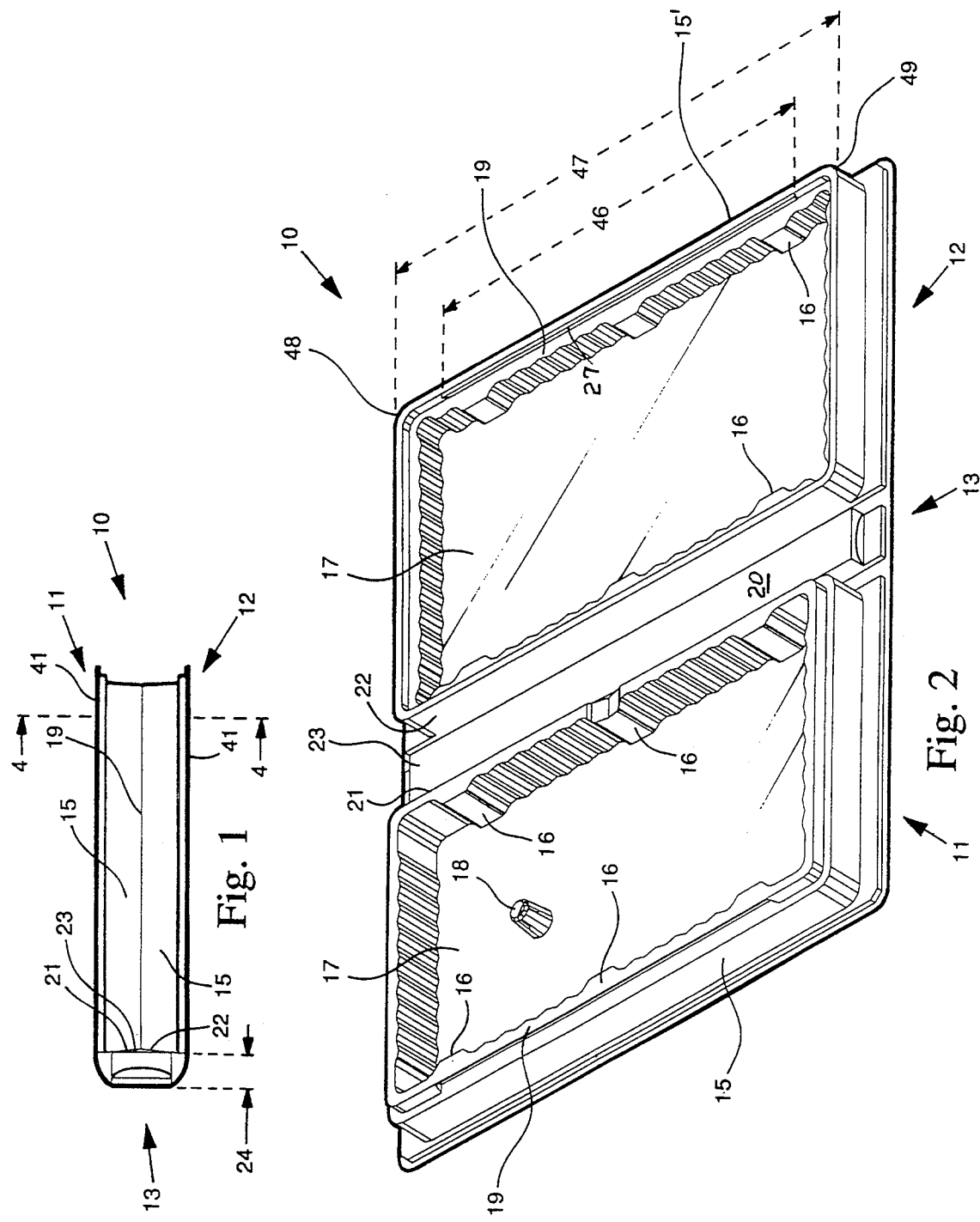

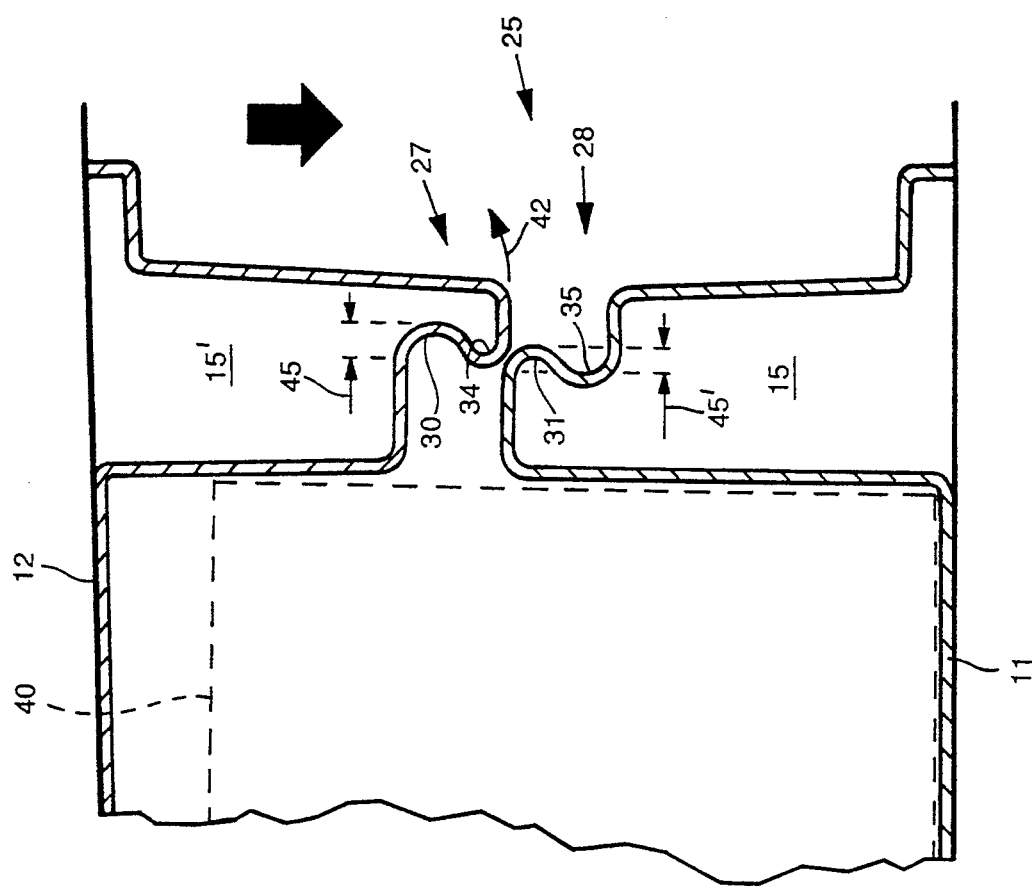
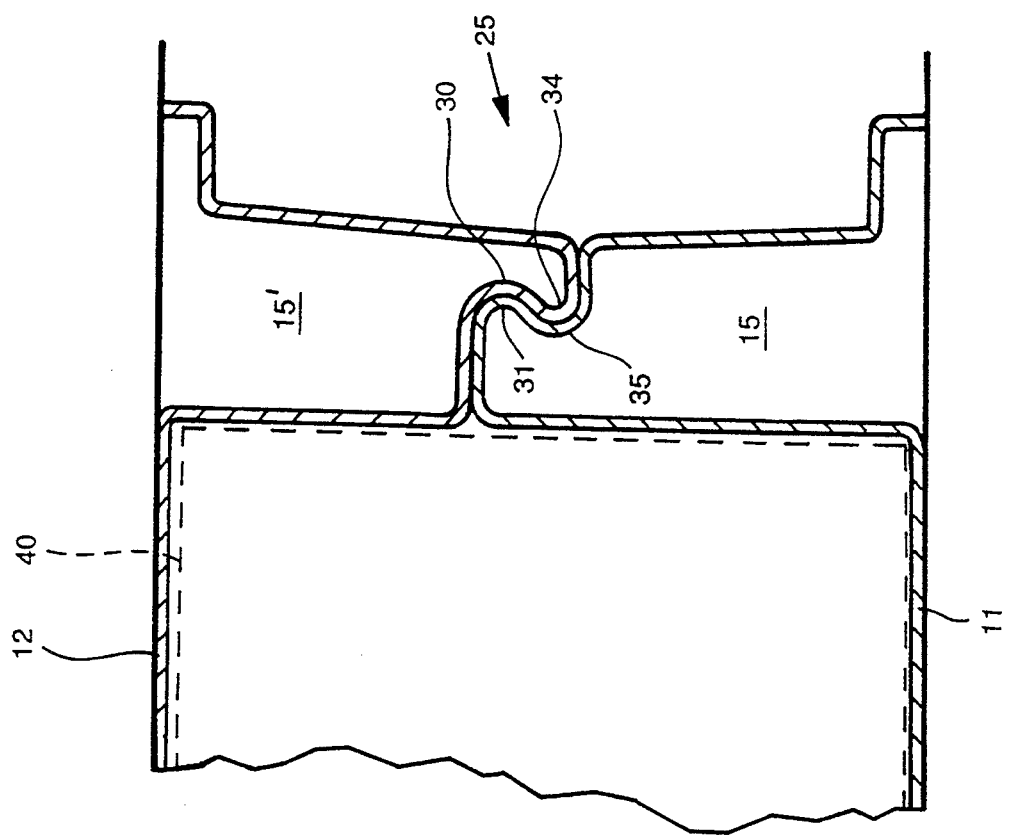

VIDEO CASE CLOSURE

RELATED APPLICATION

Commonly-owned, copending application, Ser. No. 08/117,400, filed Sep. 3, 1993, in the name of the present inventor, of which the present application is a continuation-in-part.

BACKGROUND OF THE INVENTION

This invention relates to a plastic package, in particular, a mostly plastic case designed to hold various objects, such as, for example, a video cassette.

Plastic packages such as video cases have been manufactured for many years. The typical process consists of thermo-vacuum-forming a relatively rigid thermoplastic sheet, such as polyvinyl chloride (PVC), to form opposed inner contoured surfaces configured to receive and hold the video cassette or other object when the case is closed by folding about its spine, then covering the back side of the rigid sheet with a cardboard stiffener, an opaque relatively flexible PVC sheet, and a clear relatively flexible PVC sheet, followed by heat-sealing together the sandwich so formed so as to seal the cardboard stiffener between the rigid PVC and the flexible opaque PVC sheets and the latter to each other and to the clear PVC sheet around three sides so that advertising material for the contents of the case can be inserted through the unsealed fourth side and thus be visible to prospective customers and users of the video cassette. Typically, for PVC, the relatively rigid sheet has a thickness between about 0.008 and 0.030 inches (in.), and the relatively flexible sheets have thicknesses ranging between about 0.003 and 0.020 in. The term "rigid" or "relatively rigid" is a term of art meaning a sheet thickness that will hold its shape when thermo-formed, is usually but not always thicker than the flexible sheet or relatively flexible sheets, but still has sufficient flexibility to allow the case to bend easily around its spine and thus easily open and close. However, this degree of flexibility is insufficient to stiffen the case sides, which in use are not supposed to bend. Hence, it is common practice to insert a stiffener member in the case sides to stiffen the latter. Typically, the stiffener member is made of a non-heat-sealable material such as, for example, inexpensive cardboard about 0.018 to 0.120 in. thick, with score lines or slits defining a center spine to allow the flat sides of the stiffener member to bend around the score lines or slits when the case is closed.

The trend for many years has been to reduce the manufacturing cost of such cases. The major expense is labor, and a major way to reduce labor costs is to increase production. The production expenses include inserting advertising material in the cover, closing and opening the finished case, and at times opening up the case, inserting a conventional video cassette and closing the case. In some circumstances, especially when the advertising material is relatively thick, a normally closed case will spring open during manufacture, causing delays and interrupting the case assembly process. The typical closure for holding the case closed is an angled side at one case side adapted to mate in a friction fit with an angled side on the other case side. This closure has not proven entirely satisfactory especially as production rates increased, primarily because of the close tolerences required to be maintained for satisfactory operation.

SUMMARY OF THE INVENTION

An object of the invention is a plastic package construction and method of manufacture that affords a substantial increase in production rates and thus reduced manufacturing costs.

Another object of the invention is an improved case closure for a video case.

In accordance with one aspect of the invention, the improved closure for the plastic package comprises two generally half-round, interlocking members, one provided on the edge of the package base and one on the edge of the package cover. It has been found that the interlocking half-round closure provides for easy closure with the desired positive lock which maintains the package or case in its closed condition during normal handling in the production process, yet remains easy to open and close by the ultimate consumer-user.

In a preferred embodiment in accordance with the invention, the interlocking half-round closure extends over more than one-half but less than three-quarters of the length of the package side and spaced from the corners. This arrangement provides the positive lock desired while at the same time not interfering with the fabrication of the relatively rigid plastic part by inexpensive vacuum-forming techniques.

In a further preferred embodiment, the improved closure is combined with a raised spine in the package to control closing of the package by engagement with the walled sections configured to receive the cassette.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

FIG. 1 is an end view of one form of video case in accordance with the invention shown in its closed position;

FIG. 2 is a perspective view of the case of FIG. 1 shown in its open position;

FIG. 4 is a cross-sectional view of the case of FIG. 1 along the line 4—4;

FIG. 5 is a view similar to that of FIG. 4 showing the case just before it achieves the closed condition.

DETAILED DESCRIPTION OF THE PREFERRED EMBODIMENTS

Figure 3:
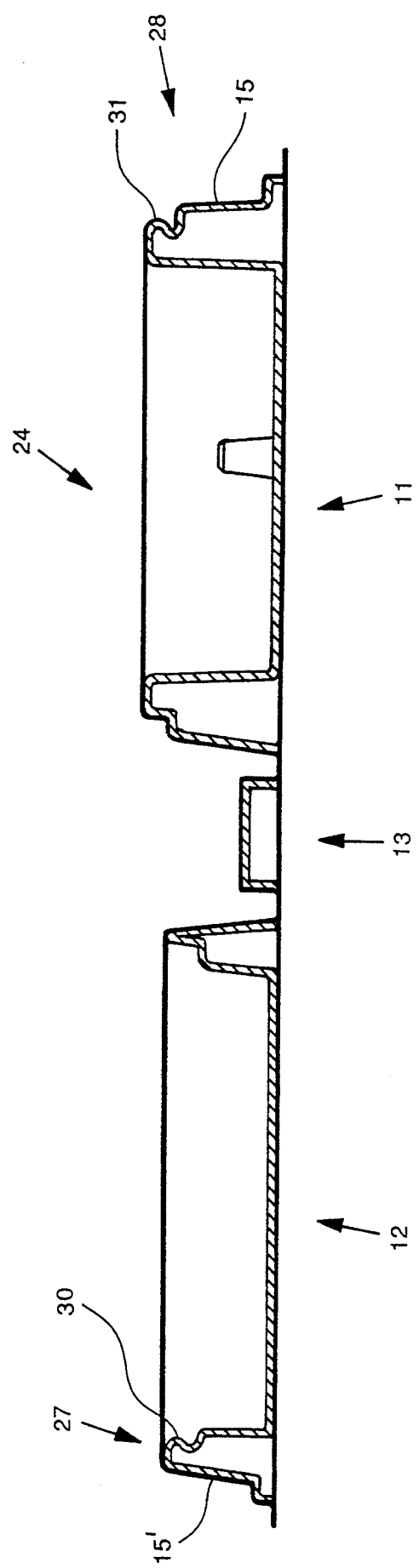
FIG. 3 is a cross-sectional view of the contoured side of the relatively rigid sheet before assembly into the case of FIG. 1.

FIG. 1 shows an end view of one form of plastic package or case 10 in accordance with the invention. The case 10 comprises a base part 11 and a cover part 12 joined at the left side by spine 13. The position depicted in FIG. 1 is with the case closed and with a possible video cassette or other object (not shown) enclosed within the case 10. FIG. 2 shows the case 10 in its open position with any video cassette removed. Each case side is made up of a continuous wall 15, 15' with opposite projecting portions 16 whose spacing is such as to allow a standard video cassette to fit inside the wells 17 formed by the walled region 15. A projection 18 close to the center on the base side 11 engages an opening in the video cassette when present. The depth of each well 17 formed inside the wall 15 is such as to accommodate one-half of the video cassette thickness so that when the case is folded into its closed position, the top wall surfaces 19 can engage as shown in FIG. 1.

The spine 13 extends down the center of the case between both sides 11, 12. The spine 13 comprises an elongated, generally rectangular raised member 20 having a height 24 as shown such that the two sides 21, 22 of the adjacent walls 15, 15' of the case sides engage the top surface 23 of the spine 20 which helps to align the case sides so that they close easily. The contact is shown in FIG. 1.

The case 10 in FIG. 2 is manufactured in a preferred embodiment of the invention as follows. A sheet of any rigid thermoplastic material, such as PVC or styrene, is placed over a suitable vacuum mold and subjected to heat and pressure in a conventional manner to cause the sheet to soften and conform to the mold surfaces to produce one or more contoured members 24 (FIG. 3). The contoured member 24 retains its molded shape, which is the reason why it is referred to in the art as rigid PVC. To clarify the description, the same reference numerals will be used for the member 24 as was used for the completed case 10. Thus, two adjacent case halves 11 and 12 are formed joined at their center by a spine 13 forming an integral thermoformed thermoplastic member. The cross-section of this rigid member is shown in FIG. 3.

As explained above and in more detail in the parent application, Ser. No. 117,400, whose contents are herein incorporated by reference, a stiffener member (not shown) is added at the bottom of the cross-section shown in FIG. 3 to stiffen the cover. The further processing consists of laying over the stiffener member the opaque relatively flexible thermoplastic sheet followed by the clear relatively flexible thermoplastic sheet. A turntable then rotates the assembly between the electrodes of a conventional heat-sealing machine which seals the periphery on the rigid member of the assembly permanently securing the stiffener member in position.

An important feature of the present invention is the locking closure 25 for the case. FIG. 4 is an enlarged view of the relatively rigid part 24 assuming that the base 11 and cover 12 have been brought together into the closed position. As will be noted, the closure 25 comprises a male part 27 on the cover wall 15' which engages a female part 28 on the base wall 15. The mating parts 27, 28 are configured in the form of half-rounds that when engaged form an easy-closing, positive lock between case cover and base. Each half-round member comprises a first rounded shape adjacent a second rounded shape. In the preferred embodiment, the first rounded shape 30 on the cover 12 is female, and mates with a first male smaller rounded shape 31 on the base 11. Conversely, the second rounded shape 34 on the cover 12 is male, and mates with a second female larger rounded shape 35 on the base 11. Preferably, the radius of the smaller, male, half-rounded shapes is in the range of 1/64-3/64 in., and the radius of the larger, female, half-rounded shapes is in the range of 1/32-3/32 in.

The reason for the configuration can be seen from the view in FIG. 5, which shows the closure parts 27, 28 as they come together and touch just before engagment, in this case with a cassette 40 in position on the base 11. Without the cassette, the base wall 15 containing the base closure part 28 is slightly flexible laterally, which would tend to allow the cover to open more easily. But, with the cassette 40 in place, the cassette, which is much stiffer, makes it very difficult for the base wall 15 to flex, which means that the wall 15' on the cover will flex outwardly as shown by the arrow 42 when the rounded parts of the closure are brought together allowing the closure halves to snap together in its locked position.

The dimensions of the closure joint 25 is important to control fabrication and operation. As will be noted, the shape of the closure parts forms undercuts into which the vacuum mold fits. If these undercuts are too deep, then it is extremely dificult to remove the vacuum-formed part from the mold, normally done by air pressure by blowing it off of the mold. Hence, it is preferred that the lateral dimension of the closure female half-rounds, referred to by reference numeral 45, be maintained in the range of 1/32-3/32 in., whereas the lateral dimension of the closure male half-rounds, referred to by reference numeral 45' be maintained in the range of 1/64-3/64 in. For similar reasons, the closure half-rounds should extend along the length of the wall edge, spaced from the corners 48, 49, in the range of one-half to three-quarters, designated 46, of the full length side 47. If made too long, removal of the molded part from the mold will be more difficult. If made too short, then the desired positive lock to keep the case closed will not be obtained.

However, it will be understood that these dimensions are appropriate for the conventional video cassette case having overall dimensions of 5¼×9×1⅛ inch, and for other case or package dimensions, other dimensions within the teachings stated herein may also prove satisfactory.

While the invention has been described particularly in connection with its application to a case for storing a video cassette, it will be understood that the invention is also applicable to any plastic package or case for holding any kind of an object, such as crayons, toys or cosmetics, and requiring a case closure with a more positive locking capability.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A foldable case comprising:
   a) first and second case sections joined by an integral flexible spine to form an integral body constituted mainly of plastic material, the first and second case sections on a first major side defining a well for receiving an object such that the case sections can be closed with the object inside and having a second opposed side, said integral flexible spine having a longitudinal dimension and transverse thereto a width dimension extending toward and between said first and second case sections,
   b) closure means integral with said first and second case sections for holding said case sections together when the said first and second case sections are folded together to close the case, said closure means comprising:
      (i) an elongated inverted S-shaped configuration, in cross-section, extending along the peripheral edge of each of said first and second case sections remote from the integral flexible spine, said inverted S-shaped configuration extending along the center of the respective case section peripheral edge a substantial distance parallel to the longitudinal dimension of the integral flexible spine, (ii) said inverted S-shaped configuration comprising, starting from the outer surface of its respective edge, a first curved male part followed inwardly by a second curved female part with the first male part of the first case section configured to mate with the second female part of the second case section and with the first male part of the second case section configured to mate with the second female part of the first case section when the case is closed.

2. A foldable case as claimed in claim 1, wherein said first male part in the first case section is positioned in overlapping relation and forming an interference fit with the first male part in the second case section during closure.

3. A foldable case as claimed in claim 2, wherein said overlapping relation is in the range of 1/64–3/64 inches.

4. A foldable case as claimed in claim 1, wherein the first curved male part forms, in cross-section, a half-circle having a radius in the range of 1/64–3/64 inches, and the second curved female part forms, in cross-section, a half-circle having a radius in the range of 1/32–3/32 inches.

5. The case of claim 4, wherein the the integral flexible spine comprises along its first side a raised section extending along its longitudinal dimension.

6. The case of claim 5, wherein the first and second case sections each have a rectangular wall, said inverted S-shaped configurations each extending along the length of one wall side between ½ and ¾ of the full length of the wall side.

7. A foldable case for holding a video cassette or the like, comprising:

a) first and second case sections joined by an integral flexible spine to form an integral body, each of the first and second case sections having on a first major side a walled area defining a well for receiving the video cassette such that the case sections can be closed with the cassette inside and having a generally flat surface on a second major side opposite to the first side, b) said first and second case sections and integral flexible spine comprising a sandwich made up of a thermoformed sheet of relatively rigid heat-sealable thermoplastic material on said first major side, a stiffener member of a sheet-like non-heat-sealable material on said thermoformed sheet on the second major side, and at least one relatively flexible sheet of heat-sealable thermoplastic material over the stiffener member and heat-sealed around its periphery to the periphery of the thermoformed sheet so as to enclose the stiffener member, c) said flexible spine having on the second major side of generally elongated rectangular well having long sides and short sides joining the long sides, d) closure means integral with said first and second case sections for holding said case sections together when the said first and second case sections are folded together to close the case, said closure means comprising:

(i) an elongated inverted S-shaped configuration, in cross-section, extending along the peripheral edge of each of said first and second case sections remote from the integral flexible spine, said inverted S-shaped configuration extending along the center of the respective case section peripheral edge, spaced from the corners, a substantial distance parallel to the longitudinal dimension of the integral flexible spine, (ii) said inverted S-shaped configuration comprising, starting from the outer surface of its respective edge, a first curved male part followed inwardly by a second curved female part with the first male part of the first case section configured to mate with the second female part of the second case section and with the first male part of the second case section configured to mate with the second female part of the first case section when the case is closed.

8. The case of claim 7, wherein the first and second case sections each have a rectangular wall, said half-rounded members each extending along the length of one wall side between ½ and ¾ of the full length of the wall side.

9. The case of claim 8, wherein the thermoformed member is vacuum formed and is constituted of PVC.

10. The case of claim 8, wherein the integral flexible spine comprises a raised section.

11. The case of claim 10, wherein the first curved male part has a radius in the range of 1/64–3/64 inch, and the second curved female part has a radius in the range of 1/32–3/32 inch.

12. The case of claim 11, wherein the integral body is configured such that portions of the case sections engage the spine to align the case sections when closed.

* * * * *